US011537570B2

(12) United States Patent
Bamel

(10) Patent No.: US 11,537,570 B2
(45) Date of Patent: Dec. 27, 2022

(54) SYSTEMS AND/OR METHODS FOR MIGRATING LIVE DATABASE SCHEMAS TO SUPPORT ZERO DOWNTIME DEPLOYMENTS WITH ZERO DATA LOSSES

(71) Applicant: Software AG, Darmstadt (DE)

(72) Inventor: Ajay Singh Bamel, Bengaluru (IN)

(73) Assignee: SOFTWARE AG, Darmstadt (DE)

( * ) Notice: Subject to any disclaimer, the term of this patent is extended or adjusted under 35 U.S.C. 154(b) by 43 days.

(21) Appl. No.: 17/108,484

(22) Filed: Dec. 1, 2020

(65) Prior Publication Data
US 2022/0171748 A1    Jun. 2, 2022

(51) Int. Cl.
*G06F 16/21* (2019.01)
*G06F 16/22* (2019.01)
*G06F 11/14* (2006.01)
*G06F 16/23* (2019.01)

(52) U.S. Cl.
CPC ........ *G06F 16/214* (2019.01); *G06F 11/1451* (2013.01); *G06F 11/1464* (2013.01); *G06F 16/211* (2019.01); *G06F 16/2282* (2019.01); *G06F 16/2358* (2019.01); *G06F 2201/80* (2013.01)

(58) Field of Classification Search
CPC .. G06F 16/214; G06F 16/219; G06F 16/2379; G06F 16/25; G06F 16/27; G06F 16/273; G06F 11/1451; G06F 11/1464; G06F 16/211; G06F 16/2282; G06F 16/2358; G06F 2201/80
See application file for complete search history.

(56) References Cited

U.S. PATENT DOCUMENTS

| 8,200,634 | B2 | 6/2012 | Driesen et al. |
| 8,521,706 | B2 | 8/2013 | Alpern et al. |
| 11,042,517 | B2 * | 6/2021 | Stegmann ........... G06F 16/2343 |

(Continued)

OTHER PUBLICATIONS

Github—electronically retrieved Nov. 4, 2020, 2 pages. https://github.com/github/gh-ost.

(Continued)

*Primary Examiner* — Cindy Nguyen
(74) *Attorney, Agent, or Firm* — Nixon & Vanderhye P.C.

(57) ABSTRACT

Certain example embodiments relate to data migration. During setup, migration reference and change log tables are created. The former includes instructions for implementing changes to accommodate the migration. A custom migration procedure is generated to process these instructions. Triggers are created to automatically record, in the change log table, information about data-related actions performed on tables structured using the source schema. During backup, the triggers are activated, and the migration procedure is run to conform a restored version of the data in the tables structured using the source schema to the target schema. During migration, data modifications made to the tables structured using the source schema during the backup stage are replicated in the tables structured using the target schema, by processing the information about the data-related actions recorded in the change log table using the migration procedure, while the triggers also replay further data-related actions encountered during the migration.

25 Claims, 10 Drawing Sheets

(56) References Cited

U.S. PATENT DOCUMENTS

| | | | |
|---|---|---|---|
| 2015/0248403 | A1 | 9/2015 | Pazdziora et al. |
| 2016/0085542 | A1* | 3/2016 | Meissner ............... G06F 16/27 707/634 |
| 2017/0322990 | A1* | 11/2017 | Tran ..................... G06F 16/21 |
| 2019/0251180 | A1* | 8/2019 | Lachambre ........... G06F 16/258 |
| 2021/0081379 | A1* | 3/2021 | Buehne ................ G06F 16/275 |

OTHER PUBLICATIONS

FaceBook—Online Schema Change for MySQL, electronically retrieved Nov. 4, 2020, 4 pages. https://m.facebook.com/notes/mysql-at-facebook/online-schema-change-for-mysql/430801045932/.

FaceBook—Facebook Incubator Online Schema Change, electronically retrieved Nov. 4, 2020, 2 pages. https://github.com/facebookincubator/OnlineSchemaChange.

Percona, PT Online Schema Change, electronically retrieved Nov. 4, 2020, 11 pages. https://www.percona.com/doc/percona-toolkit/LATEST/pt-online-schema-change.html.

Cenkalti Darbe—electronically retrieved Nov. 4, 2020, 1 pages. https://github.com/cenkalti/darbe.

SQLShack—electronically retrieved Nov. 4, 2020, 3 pages. https://www.sqlshack.com/sql-server-database-migrations-with-zero-data-loss-and-zero-downtime/.

Oracle Zero Downtime Migration—electronically retrieved Nov. 4, 2020, 3 pages. https://www.oracle.com/database/technologies/rac/zdm.html.

https://thenewstack.io/deployment-strategies/ Six Strategies for Application Deployment, Nov. 21, 2017, 6 pages.

* cited by examiner

| TABLE_NAME | OLD_COLUMN_NAME | NEW_COLUMN_NAME | SUBSTITUTE_VALUE | SUBSTITUTE_COLUMN_NAMES |
|---|---|---|---|---|
| dependents | relationship | relationship | SUBSTRING({0},1,10) | relationship |
| employees | *ADDED* | gender | 'NOT DEFINED' | |
| employees | email | email_id | {0} | email |
| employees | employee_id | emp_id | {0} | employee_id |
| employees | salary | salary | ROUND({0}) | salary |

Fig. 7

| INSERT_SQL |
|---|
| INSERT INTO `schema-v2`.employees (`emp_id`,`first_name`,`last_name`,`email_id`,`phone_number`,`hire_date`,`job_id`,`salary`,`manager_id`,`department_id`,`gender`) SELECT employee_id, first_name, last_name, email, phone_number, hire_date, job_id, ROUND(salary), manager_id, department_id,'NOT DEFINED' FROM `schema-v1`.employees |

Fig. 8

| UPDATE_SQL |
|---|
| UPDATE `schema-v2`.employees n INNER JOIN `schema-v1`.employees o ON n.emp_id=o.employee_id SET n.emp_id=o.employee_id, n.first_name=o.first_name, n.last_name=o.last_name, n.email_id=o.email, n.phone_number=o.phone_number, n.hire_date=o.hire_date, n.job_id=o.job_id, n.salary=ROUND(o.salary), n.manager_id=o.manager_id, n.department_id=o.department_id, n.gender='NOT DEFINED' |

Fig. 9

```
INSERT INTO locations(location_id,street_address,postal_code,city,state_province,country)
VALUES (***, '2004 Charade Rd','98199','Seattle','Washington','US');

INSERT INTO employees(employee_id,first_name,last_name,email,phone_number,hire_date,job_id,salary,manager_id,department_id)
VALUES (***,'Shelley','Higgins','shigins@sqltutorial.org','515.123.8080','1994-06-07',***,***,**,***);

INSERT INTO departments(department_id,department_name,location_id) VALUES (***,'Accounting',*****);

UPDATE employees SET department_id=** WHERE employee_id=**;

DELETE from departments WHERE department_id=*;
```

Fig. 14

| CHANGE_ID | CHANGE_TABLE_NAME | CHANGE_OPERATION | LAST_FAILED_OPERATION | WHERE_CONDITION | WHERE_CONDITION_FOR_UPDATE_DELETE | EVENT_DT | PROCESSED_FLAG | UPDATE_REMARKS |
|---|---|---|---|---|---|---|---|---|
| 1 | locations | INSERT | | 'location_id' = '1700' | | 2020-11-26 06:10:41 | 0 | |
| 2 | employees | INSERT | | 'employee_id' = '205' | | 2020-11-26 06:10:42 | 0 | |
| 3 | departments | INSERT | | 'department_id' = '11' | | 2020-11-26 06:10:43 | 0 | |
| 4 | employees | UPDATE | | 'employee_id' = '205' | 'department_id' = '11' | 2020-11-26 06:10:43 | 0 | |
| 5 | departments | DELETE | | 'department_id' = '3' | 'department_id' = '3' | 2020-11-26 06:10:44 | 0 | |

Fig. 15

SYSTEMS AND/OR METHODS FOR MIGRATING LIVE DATABASE SCHEMAS TO SUPPORT ZERO DOWNTIME DEPLOYMENTS WITH ZERO DATA LOSSES

TECHNICAL FIELD

Certain example embodiments described herein relate to improved techniques for migrating computer database schemas. More particularly, certain example embodiments described herein relate to techniques for migrating computer database schemas without having to take offline the underlying databases during the migration.

BACKGROUND AND SUMMARY

In today's increasingly interconnected and technologically oriented world, continued availability of computer-inclusive resources is of increased importance. Software availability, broadly construed, is an important technological field related to these challenges. For example, it would be desirable to provide high availability for software relevant to an organization in contexts ranging from robotic automation used in factories to web applications used in supporting ecommerce solutions and beyond.

Providing availability during development, however, can be technologically challenging. For instance, it can be difficult to continue to provide computer-mediated services and/or resources as software and/or the like is being developed, deployed, tested, migrated, redeployed, etc. Providing software availability in these active phases can be important to ensuring that organizations are not adversely impacted during software deployment activities, for example. Following the examples above, providing software availability in these active phases can be important to ensuring that factories can continue to manufacture products, ecommerce orders can continue to be received and processed, etc.

Despite the desire to provide high availability, it unfortunately is typical in traditional deployment environments for new software releases to require their live environments to go down during software migration deployment activities. Typically, there are two layers that need to be updated for a new release. These layers include the application server and the database server.

In terms of upgrading an application server, there are various technical paradigms designed with the goal of achieving zero downtime updates. These paradigms include, for example, A/B testing or blue/green deployment, canary deployment, rolling deployment, etc. These paradigms assume two versions, namely, Version A and Version B (which is an update or change to Version A). Briefly, in A/B testing, Version B is released to a subset of users under specific conditions. Similarly, in blue/green deployment, Version B is released alongside Version A, then the traffic is switched to Version B. With canary deployment, Version B is released to a subset of users before proceeding to a full rollout. Rolling deployment (also sometimes called ramped or incremental deployment) rolls out Version B slowly and replaces Version A over time.

Although there are tools and techniques for assisting with application server related updates, database upgrades can often be a challenge, particularly when there is a need to change the schema associated with the database. A schema change may be needed, for example, to support a new version of the software, enable new features of a current deployment, etc. Currently, a database schema upgrade typically happens by means of a set of migration scripts that are run on the database. When the system is live, these migrations can become complex and oftentimes will require database locking operations. In many situations that are relatively complex and/or when the volume of requests served in connection with the database are relatively high, there may need to be some number of database-related transactions blocked or at least delayed during the migration itself. And when the database is fully migrated, some live database-related transactions may need to be blocked (e.g., because they are based on now improper requests and/or expecting results in a deprecated format).

It may in some instances be desirable to create a replica database and run migration scripts on the created replica database, rather than working on a master database. Various replication-related techniques can be used to make sure that the replica database is in sync with the master. In general, however, replication comes with its own challenges. Such challenges include, for example, difficulties associated with ensuring or otherwise handling schema backwards compatibility, replication lags, the ability to capture table changes and maintain the order sequence of such changes, problems with foreign keys, problems with primary key updates, difficulties managing tables lacking primary keys, etc.

There are several commercially-available "online" schema migration approaches that purportedly aid in migrating database schemas without requiring the database to be at least temporarily disabled. A first general approach involves migrating only the changed tables, rather than a full database schema. This approach works on the copy of the table that is to be altered, in the same schema. The approach generally involves creating a new table (also sometimes referred to as a ghost table) with a structure matching or at least similar to the original table. Changes are applied to the ghost table. Data is copied from the original table to the ghost table, typically in chunks. Copying may be performed by slowly and incrementally copying data from the original table to the ghost table, dumping data from the original table into files that are then loaded into the altered ghost table, etc. Ongoing changes (e.g., any INSERT, DELETE, and UPDATE changes applied to original table) are propagated to the ghost table. This propagation can be performed by reading a log (e.g., comprising data manipulation language (DML) statements from a binary log stream generated from database binlog events) and running logged changes on ghost the table, by adding triggers to the original table to copy data directly into ghost table, etc. Once the ghost table is in sync with the original table, the ghost table is renamed or otherwise made to function as the original, e.g., using an ALTER TABLE statement. The now-deprecated original table can be deleted.

A second general approach involves migrating the full database schema using an external migration server or tool. In this approach, live table changes are captured somewhere, before starting a backup of the database schema. When it comes to capturing changes, an external tool, custom table in the same schema, database binary logs, etc., may be used, for example. A backup from the original database schema is then taken, and the backup is restored in the new database schema. Migration scripts are executed in the new database schema. The captured changes are applied to the new database schema using the external migration server/tool.

Unfortunately, these typical approaches suffer from several drawbacks or limitations when it comes to supporting zero-downtime deployments. For example, most currently available approaches have issues with schema backwards compatibility, which can limit the extent to which solutions can be evolved. Currently available solutions also can have issues with respect to managing foreign keys in a change table and supporting updates for primary key(s) in the change table. Because atomic renaming is not always supported, "table not found" type errors can occur for a short time period. The lack of atomic renaming support in the context of ghost table related implementations implies that when a tool renames the ghost table as the original and deletes/renames the original one, database transactions may fail because of the unavailability of table that they are looking for and, thus, client computing systems may at least temporarily receive table not found type errors. Table renames may require locking, and migrating a large database or portion thereof may require blocking transactions. Replication lags may occur during asynchronous replication, and there may be wasted effort when multiple updates on the same row (for example) are migrated using multiple statements. Database binary log stream input/output (I/O) operations may be resource intensive and such events may impose network delays during migration. Also, in the above approaches, human intervention during migration activity may be needed.

Some other known approaches use a middleware migration server for a migration process that replicates data to a destination database in an asynchronous manner by reading a database binary log stream or maintaining a change log somewhere. Unfortunately, because the migration server is an external entity, it can cause some amount of network lag and can slow down the replication process.

Another known approach creates view editions for pre-upgrade and post-upgrade objects (e.g., tables). Unfortunately, the creation of post-upgrade tables requires a full copy of the data from the pre-upgrade tables, which introduces replication lags in live scenarios. Furthermore, changing "non-editioned" tables for each upgrade can require unacceptable amounts of downtime and cannot be regarded as a zero-downtime approach. From an overall perspective, this approach can be resource intensive in requiring three tables (pre-upgrade, post-upgrade, and non-editioned objects) and two views to migrate just one live table.

Certain example embodiments help address the above-described and/or other technical challenges. For example, certain example embodiments support zero-downtime deployments when migrating live database schemas, e.g., during upgrade and/or other processes. Advantageously, data is not lost during this approach. Certain example embodiments take required inputs from the user and create a replica database instance that can be configured with the new version of the software, followed by a switch at the application layer with the help of load-balancers, to achieve zero downtime deployment. The approach of certain example embodiments can help address the technical challenges identified above including, for example, difficulties associated with ensuring or otherwise handling schema backwards compatibility, replication lags, the ability to capture table changes and maintain their order sequence, problems with foreign keys, problems with primary key updates, difficulties managing tables lacking primary keys, etc.

Rather than creating a ghost table for every altered table that undergoes a schema change and replicating data into it by reading a database binlog or other stream, certain example embodiments work with a replica schema created by taking a database dump, restoring it, and replicating data using cross-schema triggers and stored procedures.

In certain example embodiments, there is provided a method for migrating data in a database provided by a database server to a target database schema from tables structured according to a source database schema. The database server is configured to receive and respond to requests from external client devices using the database. In a setup stage, while allowing data modifications to be performed on the tables in the database structured according to the source database schema: a migration reference table and a migration change log table are created on the database server, in response to an indication that data in the database is to be migrated; the migration reference table is automatically populated with instructions performable to implement changes to accommodate the migration; a custom migration procedure, performable within the database server, to process the instructions in the migration reference table to perform the migration, is automatically generated; and multi-purpose, cross-schema triggers are automatically created. These triggers are structured to (a) record, during a backup stage, in the migration change log table, information about data-related actions performed on tables in the database structured according to the source database schema, and (b) replay further data-related actions performed on tables in the database structured according to the source database schema encountered during a migration stage to be reflected in new tables structured according to the target database schema and handle anticipated exceptions encountered during the replay, wherein the triggers are automatically performable within the database server once activated. In the backup stage: the created triggers are activated to enable the recording of (a); and the generated custom migration procedure is run to conform a restored version of the data in the tables structured according to the source database schema to the target database schema, while the created triggers are activated and while also allowing data modifications to be performed on the tables in the database structured according to the source database schema. In the migration stage: data modifications made to the tables in the database structured according to the source database schema during the backup stage are replicated in the tables structured according to the target database schema using the generated custom migration procedures by processing the information about the data-related actions recorded in the migration change log table, while continuing to have the created triggers active to perform the replaying of (b). Following the migration stage, new incoming requests are received and responded to in connection with the tables structured according to the target database schema.

According to certain example embodiments, the instructions performable to implement changes to the source database schema to accommodate the migration may be SQL statements, e.g., insert, delete, and update type SQL statements. The SQL statements in some instances may be stored in a common row of the migration reference table.

According to certain example embodiments, the creating may further create a schema changes table; a user may populate the schema changes table with migration definitions that facilitate the source database schema being modified into the target database schema; and the creation of the triggers and the generation of the custom migration procedure may be based on the migration definitions in the schema changes table.

According to certain example embodiments, the triggers may be structured as AFTER_statements for the recording of (a). For instance, triggers may be created for insert, delete, and update actions performed with respect to the data in the database for the recording of (a).

According to certain example embodiments, prior to the running of generated custom migration procedure and while the created triggers are activated, the database may be backed up during the backup stage, e.g., with data modifications being performable on the tables in the database structured according to the source database schema during the backing up. This backed up database may be restored prior to the running of generated custom migration procedure in certain example embodiments.

According to certain example embodiments, the migration change log table may associate data changes with unique identifiers of the data being changed. In certain example embodiments, associations in the migration change log table may store WHERE conditions without also storing new data itself. Processing of the change log table entries may, for example, cause the new data to be retrieved, in real time, from the tables according to the source database schema for inclusion in the tables according to the target database schema, in certain example embodiments.

According to certain example embodiments, the anticipated exceptions may relate to data and/or data structure synchronization, e.g., primary key constraint violations and/or foreign key constraint violations for insert, update, and delete operations.

The technology disclosed herein contemplates these features being implemented in systems and/or devices such as, for example, a database server, comprising a database backed by a non-transitory computer readable storage medium; and at least one processor configured to perform the functionality summarized above and described more fully herein; a system including both an application server and a database server; etc. The technology disclosed herein also contemplates non-transitory computer readable storage media storing instructions that, when executed, perform the functionality summarized above and described more fully herein.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 4 is a migration reference table in accordance with the FIG. 3 HR example;

FIG. 5 is a migration stage table in accordance with the FIG. 3 HR example;

FIG. 6 is a migration change log table in accordance with the FIG. 3 HR example;

FIG. 7 is a table showing user input defining changes to the FIG. 3 example HR schema;

FIGS. 8-9 show insert and update SQL statements for the employee table in accordance with the changes being made to the FIG. 3 example;

FIG. 14 is a set of example statements that are runnable on "schema-v1" in accordance with the HR example; and FIG. 15 shows the migration change log table after the FIG. 14 statements are run while the migration stage is set to BACKUP in the migration stage table.

DETAILED DESCRIPTION

Figure 1:
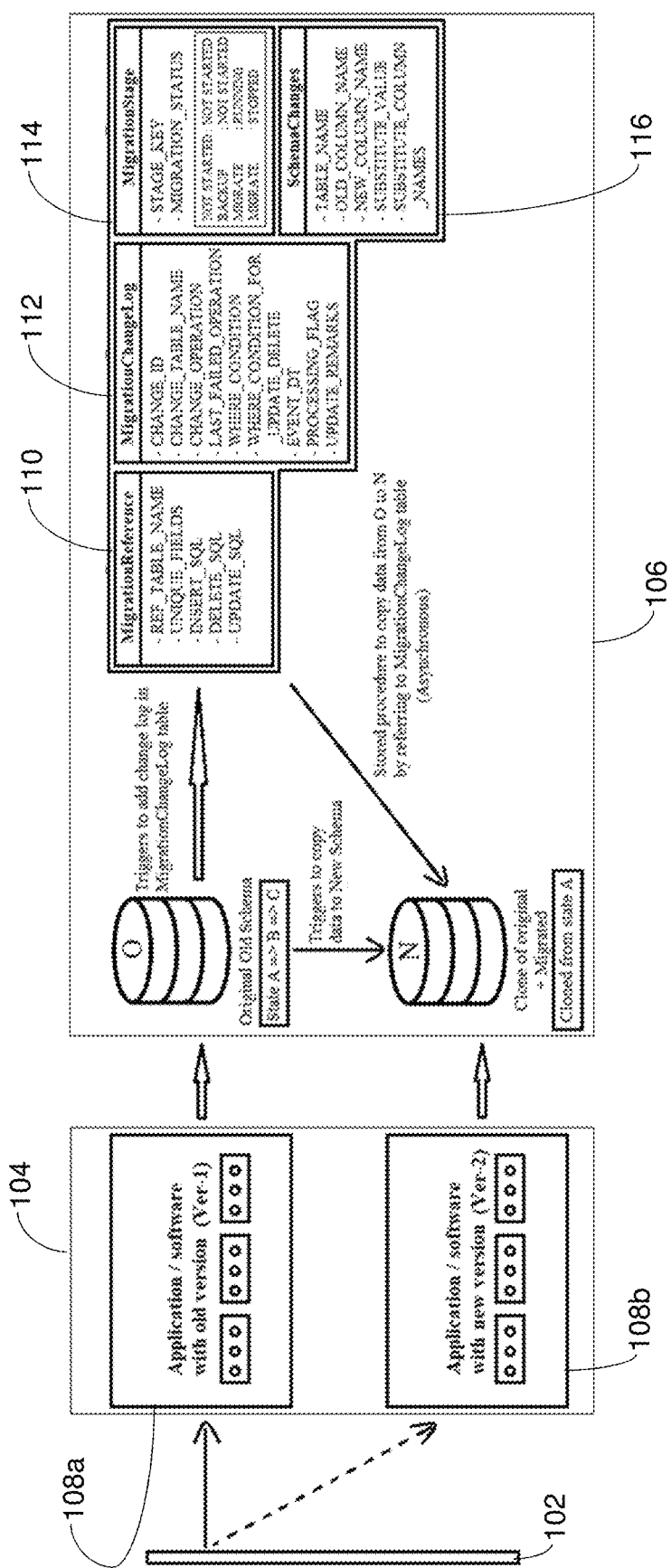
FIG. 1 is a block diagram showing the overall architecture of certain example embodiments.

Certain example embodiments provide a technical approach for upgrading a software database in a live computing environment to support zero-downtime deployment with zero data loss. It will be appreciated that "zero-downtime" in this context means that "live" database-related requests can be handled as they continue to stream in to the application server. "Normal" operational lags, however, may still be encountered with the system still being considered as having zero-downtime, as will be appreciated by those skilled in the art. The approach of certain example embodiments advantageously can help address technical challenges including, for example, difficulties associated with ensuring or otherwise handling schema backwards compatibility, replication lags, the ability to capture table changes and maintain their order sequence, problems with foreign keys, problems with primary key updates, difficulties managing tables lacking primary keys, etc. As will become clearer from the description below, certain example embodiments switch from the original database (and original database schema) to the new database (and new database schema) only after the database layer is migrated. Moreover, as will become clearer from the description below, in certain example embodiments, live transactions happening in connection with the original database schema are replicated for the new database schema while migration is in progress using cross-schema triggers and stored procedures, thereby enabling zero-downtime operations.

The approach of certain example embodiments uses a new target schema created and a database dump taken from a source schema. More particularly, the migration process of certain example embodiments includes three main stages. The first phase is a setup stage. This stage involves creating several migration tables, as well as triggers on each table defined in the source schema so as to facilitate the capture of data-related table changes. For instance, AFTER_{INSERT, UPDATE, DELETE} triggers may be created on each table of the source schema to capture the data-related table changes thereto. The second stage is a backup stage in which the triggers are activated, the database is backed up, and the new schema is created with the aid of the migration tables. The data from the backed up database in the source schema is restored into the new schema using migration scripts. The third stage is a migrate stage. This stage helps copy data from the source schema tables to the destination schema tables asynchronously. The data that is copied over is data updated during the backup, restore, and migration operations, from the backup stage. In parallel, the third stage copies any further live data updates to the destination schema tables directly, e.g., using AFTER_triggers or the like. Thus, in certain example embodiments, the triggers may be thought of as being cross-schema triggers applied to each table in the database. In certain example embodiments, the triggers in the backup stage create entries in the migration change log table for each transaction, whereas the same triggers in the migrate stage start copying data directly into the database tables formatted in accordance with the new schema.

Certain example embodiments advantageously avoid the need for any external tool/migration server dependency by leveraging triggers and procedures to facilitate the migration zero-downtime deployment. That is, in certain example embodiments, reliance on an external tool can be eliminated as the migration can happen on the database server itself using procedures and triggers therein, e.g., as explained in greater detail below.

Example Implementation

Details concerning an example implementation are provided below. It will be appreciated that this example implementation is provided to help demonstrate concepts of certain example embodiments, and aspects thereof are non-limiting in nature unless specifically claimed. For instance, certain example code snippets, SQL statements, table structures, table contents, table changes, etc., are provided below to ease understanding of the example embodiments described herein and are not limiting unless explicitly claimed.

FIG. 1 is a block diagram showing the overall architecture of certain example embodiments. In the FIG. 1 example architecture, requests are routed through a load balancer 102 (e.g., a NGINX or other load balancer) to one or more application servers 104 over a network or other suitable wireless or wired connection. The application server(s) 104 interface(s) with a database server 106, e.g., again over any suitable wired or wireless connection. The application server(s) 104 and the database server 106 are backed by one or more computing systems. The one or more computing systems comprise processing resources including processors and memories, volatile and non-volatile storage, etc. In certain example embodiments, the application server(s) 104 and the database server 106 may be co-hosted on a common computing platform. In different example embodiments, different computing systems may be used for the application server(s) 104 and the database server 106. In certain example embodiments, some or all of these resources of the application server(s) 104 and/or the database server 106 may be provided in a cloud or other distributed computing environment.

The application server(s) 104 support(s) web applications or software arrangements. These programs may be Java programs, executable binaries, collections of web services, and/or the like, etc. In the FIG. 1 example, the programs supported by the application server(s) 104 include the initial version of the application or software 108a and the new version of the application or software 108b. The symbols inside of the application versions 108a-108b indicate any kind software/application having an arbitrary number of modules, components, etc., and thus having any amount of complexity. The approach of certain example embodiments can proceed largely without regard to the application layer, and instead can focus on migrating the database layer. The new version of the application or software 108b may be an update to, replacement of, or other modification relating to, the initial version of the application or software 108a, in different instances. The solid line from the load balancer 102 to the application server(s) 104 indicates that requests are routed to the initial version of the application or software 108a, and the dashed line from the load balancer 102 to the application server(s) 104 indicates that requests are to be routed to the new version of the application or software 108b, e.g., after the updating or upgrading is complete. In certain example embodiments, the load balancer 102 is able to make this switch once the migration is complete. In certain example embodiments, the application server(s) 104 will simply switch over to using the correct database schema once the migration is complete.

The initial version of the application or software 108a communicates with the database server 106 in connection with the original schema O, whereas the new version of the application or software 108b is to communicate with the database server 106 in connection with the new schema N. These schemas may be stored in memory on the database server 106 in certain example embodiments in certain example embodiments. The data in tables according to the new schema N is cloned from the data in the original schema O and migrated so that the new version of the application or software 108b can interface with the database server 106. Migration procedures used in certain example embodiments are set forth in greater detail below. In brief, the data in tables according to the original schema O transitions from states A to B to C, e.g., as it is updated over time. The data in tables according to the new schema N is cloned while the database is in state A, and further changes (corresponding to states B and C) are made later as a part of the migration.

Several structures are created so as to facilitate the migration from tables in accordance with the original schema O to tables in accordance with the new schema N. These structures include the migration reference table 110, the migration change log table 112, the migration stage table 114, and the schema changes table 116. The migration reference table 110 stores static references of table names, their unique fields, and SQL statements used to migrate data from tables according to the source database schema (the original schema O) to tables in the destination or target database schema (the new schema N). It therefore captures at least the following data:

The table name from source schema (REF_TABLE_NAME);

The unique fields in a table (UNIQUE_FIELDS), which can be a single column name or multiple column names based on the primary key(s), unique key(s) defined for that table, or all columns if no such keys are found;

SQL statements used to insert data into new schema table, captured by reading them from source schema table (INSERT_SQL);

SQL statements used to update data in the new schema table, captured by reading them from source schema table (UPDATE_SQL); and SQL statements used to delete data from new schema table (DELETE_SQL).

With respect to the latter three points, it is noted that these SQL statements (INSERT, UPDATE, and DELETE) in certain example embodiments are created for every "live table" using a stored procedure and through reference to the INFORMATION_SCHEMA system table. These SQL statements are used by the migration procedure in certain example embodiments to copy data from original schema (O) tables to new schema (N) tables. The Appendix F procedure "PrepareMigrateScripts" is an example that can be used to create these SQL statements using system tables, and the Appendix F procedure "MigrateChangeLogs" is an example that can use these SQL statements to copy data from the original schema tables to the new schema tables.

The migration change log table 112 helps to track the data-related table changes once the migration process starts. The migration change log table 112 therefore may include a variety of data including, for example:

An auto-incrementing column for every new change event logged, in order to help maintain and track the order of changes (CHANGE_ID);

The table name for the change log event (CHANGE_TABLE_NAME);

The change operation (INSERT/UPDATE/DELETE) from the change log event (stored as CHANGE_OPERATION);

The "where" clause used to identify a row in a table (WHERE_CONDITION), prepared using UNIQUE_FIELDS from the migration reference table 110 and field values captured inside the AFTER_triggers (explained in greater below);

In addition to the WHERE_CONDITION field, a semantically equivalent field may be provided to help process changes where there is a primary key change (WHERE_CONDITION_FOR_UPDATE_DELETE);

The date and/or timestamp for the change log event (EVENT_DT);

A flag to indicate the processing status of the change log entry (PROCESSED_FLAG), which is by default set to 0 and is changed for different processes (either triggers or migration procedure) and marked differently to keep track of who changed it and on which condition; and A field that stores additional information indicating that additional processing may be needed, e.g., upon an initial failure to process a change or modification (UPDATE_REMARKS).

The migration stage table 114 marks different stages and statuses of the migration process. This statically-structured table includes one row having data from a predefined data set of possible values, capturing stage key and migration status information. With regard to the former (stage key information), the migration stage key (STAGE_KEY) denotes the different parts of the migration process (e.g., "NOT STARTED"—at the start of the migration, "BACKUP"—at the time of taking the database dump, and "MIGRATE"—when the replication starts). Thus, the STAGE_KEY is used as a flag for cross-schema triggers to behave differently. Here, "NOT STARTED" is an initial value given for the STAGE_KEY, which indicates that the triggers will not do anything (they will neither make entries in the change log table nor copy data into the new schema table), and will simply return. By contrast, when the flag is set to "BACKUP", the triggers will start capturing the table changes for live transactions in change log table. When the flag is set to "MIGRATE", the triggers will directly copy data to new schema tables.

With regard to the latter (migration status information), the migration status (MIGRATION_STATUS) is used to denote the replication status in the migration process (e.g., "NOT STARTED"—at the start of the migration, "RUNNING"—when the replication kicks in, and "COMPLETED"—when the replication ends). This flag in essence is useful for the end user (e.g., in this instance, an administrator who is performing the migration) to indicate the overall status of the migration. At its start, it is set to "NOT STARTED", meaning that the migration has not yet started. When set to "RUNNING", the flag indicates that the migration has been started (e.g., the migration procedure "MigrateChangeLogs" is called). And when the migration procedure ends, it is set to "COMPLETED", indicating that the migration has been completed and the new DB schema is ready for use. Now, the application layer can point to the new database schema. The end user can use this flag in a dashboard or the like, e.g., to show the migration progress.

The schema changes table 116 is user-populated as per the product migration scripts. In other words, the user provides information in the schema changes table 116 in order to catalog changes or other modifications to be processed during the migration. The migration reference table 110 is automatically populated with insert, update, and delete SQL statements, taking into account the schema changes indicated in the schema changes table 116, e.g., to handle/resolve schema incompatibility issues in one step. In certain example embodiments, the changes or modifications indicated by the migration reference table 110 are not further updated after the schema change table 116 is taken into account in this process. the schema changes table 116. Similarly, and as will be appreciated from the description below, triggers may be created taking into account schema changes from the schema changes table 116, e.g., to help handle/resolve schema incompatibility issues.

The schema changes table 116 takes input like, table name (the table that is to undergo changes), old column name from the source schema (or a flag like *ADDED* if the change references a newly added column), new column name from destination schema (or a flag like *DELETED* if the change references a deleted column), substitute value (e.g., indicating how the user wants the changed column to be populated), and substitute column names (e.g., comma separated values) to replace the placeholders used in substitute value column. A defined syntax can be used in the substitute value and/or substitute column name fields so as to expand functionality and precisely define the change(s) to be implemented. For instance, expressions like {0}, {1}, . . . and so on can be used to define values from a field. Static values also can be used. Commands for rounding, taking substrings, etc., also can be used. In certain example embodiments, the syntax for these fields may be common SQL syntax, regular expressions (regexp), and/or the like.

In greater detail, a "prepare migration references procedure" populates the migration reference table 110 with the table names for all the tables available in the source schema, their unique fields and INSERT, UPDATE, DELETE SQL statements prepared using an INFORMATION_SCHEMA system table or the like, and taking into account the schema changes table 116. In many database implementations, the INFORMATION_SCHEMA provides access to database metadata, information about the database server such as the name of a database or table, the data type of a column, access privileges, etc. The INFORMATION_SCHEMA also is sometimes referred to as a data dictionary or system catalog. This "prepare migration references procedure" creates SQL statements which in turn helps create the triggers and migration procedures. That is, the SQL statements created from "PrepareMigrateScripts" procedure set forth (for example) in Appendix F are used by the migration procedure and can also be used in cross-schema triggers to copy data from original schema tables to new schema tables. It will be appreciated that these scripts could be used, or an implementer could implement their own logic, as these SQL statements will query the table to obtain the latest values even though the triggers already have references to the latest values, which can be retrieved by using the keyword "NEW" (e.g., NEW.'department_name').

AFTER_{INSERT, UPDATE, DELETE} triggers are created for all tables in the source/original schema O to capture the table changes, also taking into account the schema changes table 116. The triggers either add a change log entry to the migration change log table 112 (as indicated by the arrow to the right of the original schema O), or copy data to the new schema table directly based on the STAGE_KEY from migration stage table 114 (as indicated by the arrow from the original schema O to the new schema N).

A "migrate change log procedure" (indicated by the arrow from the grouping of tables 110-114 to the new schema N) helps to migrate data from tables in accordance with the source/original schema to tables in accordance with the new schema, in accordance with the change log event entries in the migration change log table 112, using the SQL statements from the migration reference table 110. In other words, it first looks to the change log table to determine that there was a data update made with respect to a table in accordance with the original schema, and then looks to the migration reference table to figure out how to propagate the data update for the new schema.

In summary, then, a set of shadow database migration instructions (e.g., a set of SQL statements or scripts, a compiled program, or the like) is run. This "shadow database migrator" may be hosted on and executed within the database server 106, e.g., as a series of scripts performable within the database server itself, a standalone program operating on the database server, and/or the like. It creates the migration related tables 110-116 for the live tables structured according to the original schema O, as well as the migration procedures and triggers. A database dump of the original schema O is created and the data is restored to tables structured in accordance with the schema N. The product database migration scripts are run, and the migration is performed to synchronize the data structured using the new schema N with the data structured using the original schema O, including changes to the latter that may have occurred during the backup and restore operations. Thus, although the data structured using the new schema is cloned from data structured using the original schema O while the original is in state A and prior to that data transitioning through states B and C, these changes are nonetheless ultimately reflected in the data structured in accordance with new schema N.

Figure 2:
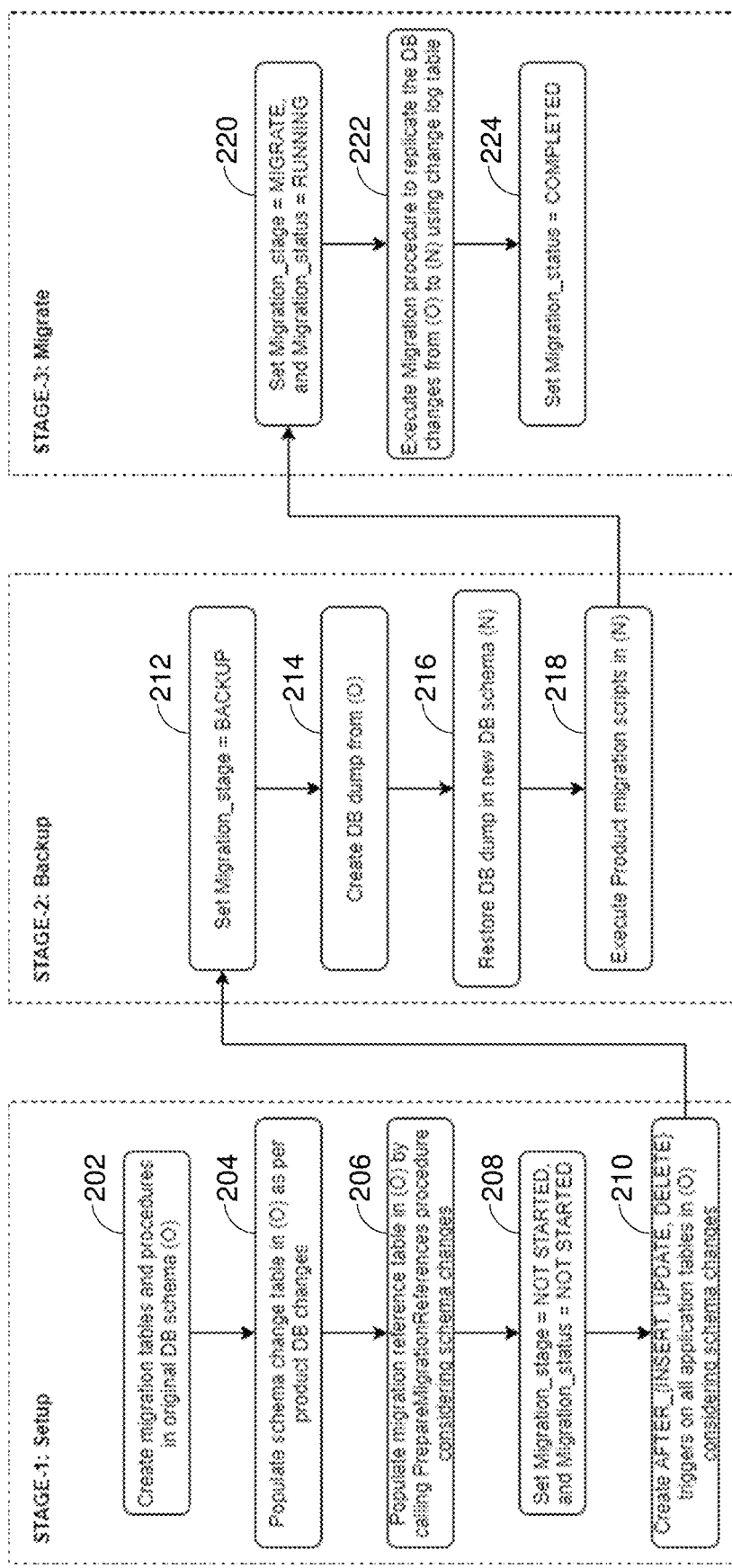
FIG. 2 is a flowchart showing in detail how the shadow database migrator operates, in accordance with certain example embodiments.

FIG. 2 is a flowchart showing in detail how the shadow database migrator operates, in accordance with certain example embodiments. As can be seen from FIG. 2, and as noted above, the overall process can be split into three logical stages, namely, setup, backup, and migrate stages. It will be appreciated that this process may be initiated manually in response to an indication that a database migration is to occur, automatically in response to a completed application server migration that also requires a database migration, etc.

The setup stage in general is used to set up the migration environment in the live database server 106. In step 202, the four migration tables (the migration reference table 110, the migration change log table 112, the migration stage table 114, and the schema changes table 116) are created using the original database schema O. The schema changes table 116 is populated in step 204, e.g., by the user to capture changes or other modifications to be made when migrating from the source to the target schema. As indicated in step 206, for changes that are incompatible with the schema, the migration reference table 110 is automatically updated with updated insert, update, and delete SQL statements prepared using the schema changes table 116 (and thus reflecting user inputs in some instances). User inputs may specify, for example, what schema changes are to be made, how to substitute values, etc. Incompatibilities may arise, for example, if there is a data type change (e.g., to change a number format with decimals to an integer format), if a table column is deleted (e.g., to reflect unused information), a single column is split into two columns (e.g., to separate first and last names), etc. See also the FIG. 7 discussion below regarding the types of inputs that can be taken from a user. In step 208, the migration stage and status are set as NOT STARTED in the migration stage table 114. The migration procedure generates log entries (in the migrate change log table 114) using triggers (AFTER_triggers) that are created on all original schema tables in step 210.

The migration stage is changed to BACKUP in the migration stage table 114 in step 212. The triggers created in step 210 are activated, and data-related changes to the tables are captured and logged in the migration change log table 112. The database dump is created from the source or original schema O in step 214, and it is restored to create the new schema N in step 216. The product specific database migration scripts are run for the new schema in step 218.

The migration is started to synchronize the new schema S with the source or original schema O. The migration procedure created in step 204 is run. As indicated in step 220, this migration procedure sets the migration stage to MIGRATE and the migration status to RUNNING in the migration stage. Data from the source or original schema O is copied to the new schema N in step 222 by reading migration change logs from the migration change log table 112 and marking the change log entries as PROCESSED. Once data structured in the original schema O and the new schema N are in sync (no more unprocessed entries indicated in the migration change log table 112), the migration status is changed to COMPLETED as indicated in step 224. It is noted that as the migration stage is changed to MIGRATE, the triggers created in step 210 will directly push data to the new schema tables. On failures, the triggers will add an entry in the migration change log table 112 table.

Figure 3:
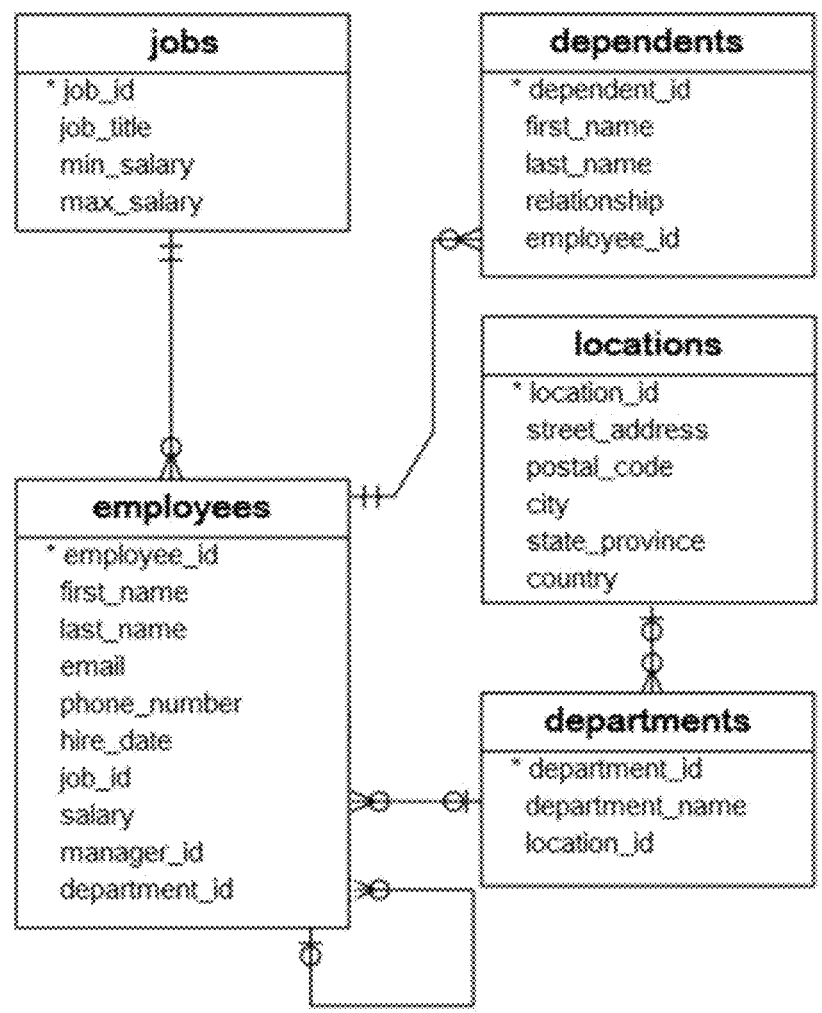
FIG. 3 is a schematic representation of an example human resources (HR) database schema used to help demonstrate how certain example embodiments operate.

An example will now be provided to help explain the functionality of certain example embodiments. This example relates to a hypothetical human resources (HR) database, as represented schematically in FIG. 3. That is, FIG. 3 is a schematic representation of an example HR database schema used to help demonstrate how certain example embodiments operate. FIG. 3 includes jobs, employees, dependents, locations, and departments tables that are linked together as shown in FIG. 3 using customary database nomenclature to indicate cardinality. The columns of the tables are shown in FIG. 3. The starred columns are primary keys.

In this example, assume that the old version of the schema is named "schema-v1" and the new schema will be named "schema-v2". Assume further that the new version of the schema will have to be changed as follows. First, the column "email" in the "employees" table will be renamed "email_id". Second, the data type of column "salary" in the "employees" table will be changed from DECIMAL (8.2) to INT. Third, the size of the column "relationship" in the "dependents" table will be reduced from VARCHAR (25) to VARCHAR (10). Third, a new "gender" column is added in the employee table, and its default value is "NOT DEFINED". Fourth, the primary key column name "employee_id" is changed to "emp_id" in the employee table.

Figures 4, 5, 6:
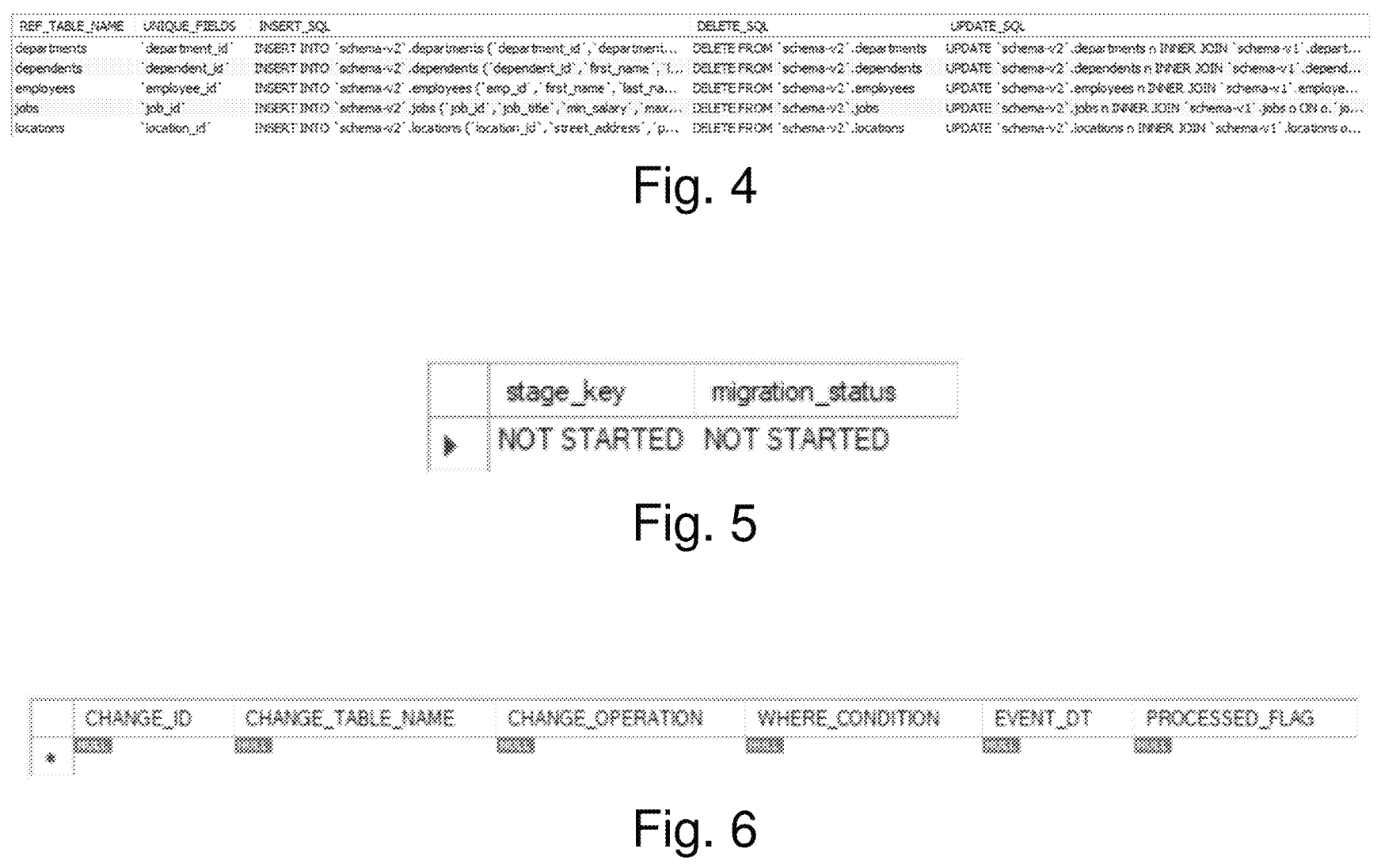

The migration will follow the operations set forth above in connection with FIG. 2. Thus, at the outset, the migration environment is set up in the live database. The migration tables are created, and the migration reference table is populated using the prepare migration references procedure, with SQL statements generated using the schema changes table 116 in order to address/resolve schema change incompatibilities in accordance with user input indicating such resolutions. FIG. 4 is a migration reference table in accordance with this HR example, populated in the manner described above to include the information described above. FIG. 4 shows some example values in the migration reference table inserted using "PrepareMigrateScripts" procedure set forth in Appendix F. FIG. 5 is a migration stage table in accordance with this HR example, and it shows that the migration has not yet started. FIG. 6 is a migration change log table in accordance with this HR example, and no changes have been logged at the outset.

The migration reference table is updated for the schema changes by taking into account user inputs provided in the schema changes table 116, e.g., in accordance with FIG. 7. That is, FIG. 7 specifies old and new column names and substitute values associated with the migration, e.g., as received from a user using a suitable user interface (which may include a wizard allowing fields to be renamed, remapped, have properties adjusted so as to reflect changes in data type, etc.). Using the user inputs set forth in FIG. 7, the migration reference table is updated for the "employee" table and for the "relationship" table. FIGS. 8-9 show insert and update SQL statements for the employee table in accordance with the changes being made to the FIG. 3 example. These SQL statements are from the migration reference table generated using the schema changes table and indicate what schema changes are to be applied by for the new schema tables. The SQL statements in the migration reference table are automatically generated to handle schema incompatibility issues, e.g., manually by developers, by being coded after taking inputs such as those shown in FIG. 7, etc. FIG. 8-9 in particular show how the "salary" column values are handled using the ROUND ( ) function, and how the "email" column name change is handled by changing the SQL statements.

The migration procedure "migrate change logs" is created, as are triggers (e.g., AFTER_triggers) for all schema tables. This is facilitated by making use of the SQL statements from the FIG. 4 migration reference table. Example flowcharts for the created procedure and triggers are provided in FIGS. 10-13.

Figure 10:
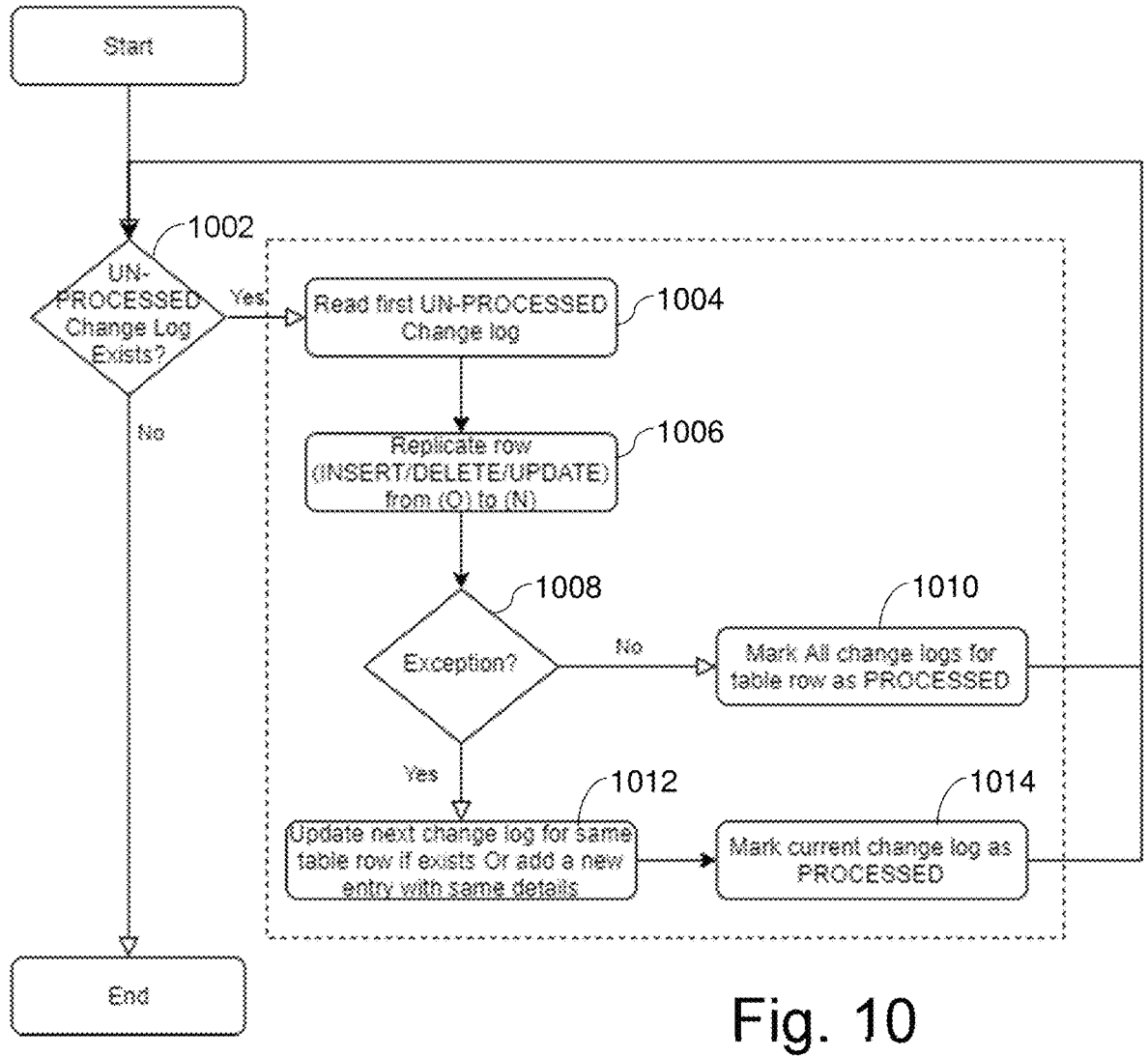
FIG. 10 is an example flowchart showing the generated MigrateChangeLogs procedure for the FIG. 3 example in accordance with certain example embodiments.

First, FIG. 10 is an example flowchart showing the generated migrate change logs procedure in accordance with certain example embodiments. In step 1002, a determination is made as to whether there are unprocessed change log entries. If so, the first unprocessed change log entry is read in step 1004. In this case, the row embeds information about particular changes (e.g., whether there are insert, delete, and/or update changes for a table, for example). The particular change(s) is/are replicated in step 1006. If the change does not throw an exception as determined in step 1008, then the change log entries for the table row are marked as processed in step 1010, and the process returns to step 1002 for possible processing of additional unprocessed change log entries. If there is an exception as determined in step 1008, then exception handling is performed in step 1012. The exception handling may include, for example, updating the next change log entry for the same row if such an entry exists, or adding a new entry with appropriate details. The change log entries for the table row are marked as processed in step 1014, and the process returns to step 1002.

One possible exception type is a foreign key constraint exception. As the latest data is copied from the original schema table to the new schema table, there may be scenarios where some foreign key columns are not yet inserted in the new schema tables and are yet to be processed from change logs. In such cases, the migration procedure will catch the exception and will update the next change log entry for the same table row to indicate that the previous change log has failed and the next change log has to be processed as per the failed change log operation. In the FIG. 15 example, the change log with CHANGE_ID 2 fail as the procedure tries to copy the latest values from the employee table having a department_id equal to 11, which is not yet available in the new schema table, as that will be available only after CHANGE_ID 3 is processed. The failure is due to the fact that the INSERT will use the most recent values from the original database table (O), where the department_id was already changed to 11—and not, as the original SQL command in FIG. 14 indicates, where department_id is 10! So, in this case, the procedure updates the CHANGE_ID 4 operation to become an INSERT operation. Alternatively, a new LAST_FAILED_OPERATION column can be introduced and CHANGE_ID 4 can be processed as INSERT operation instead of UPDATE operation.

Another possible exception type is a primary key constraint violation. There is a scenario where, while taking the database dump in step 214 in FIG. 2, there could be few transactions that might have inserted some data into the old schema table and are already a part of the dump and also will have entry in the MigrationChangeLog table as well. Thus, when the migration procedure will try to process that change log, it will throw a primary key constraint violation error. Here, the procedure may catch the exception and perform an UPDATE instead of INSERT operation.

Figure 11:
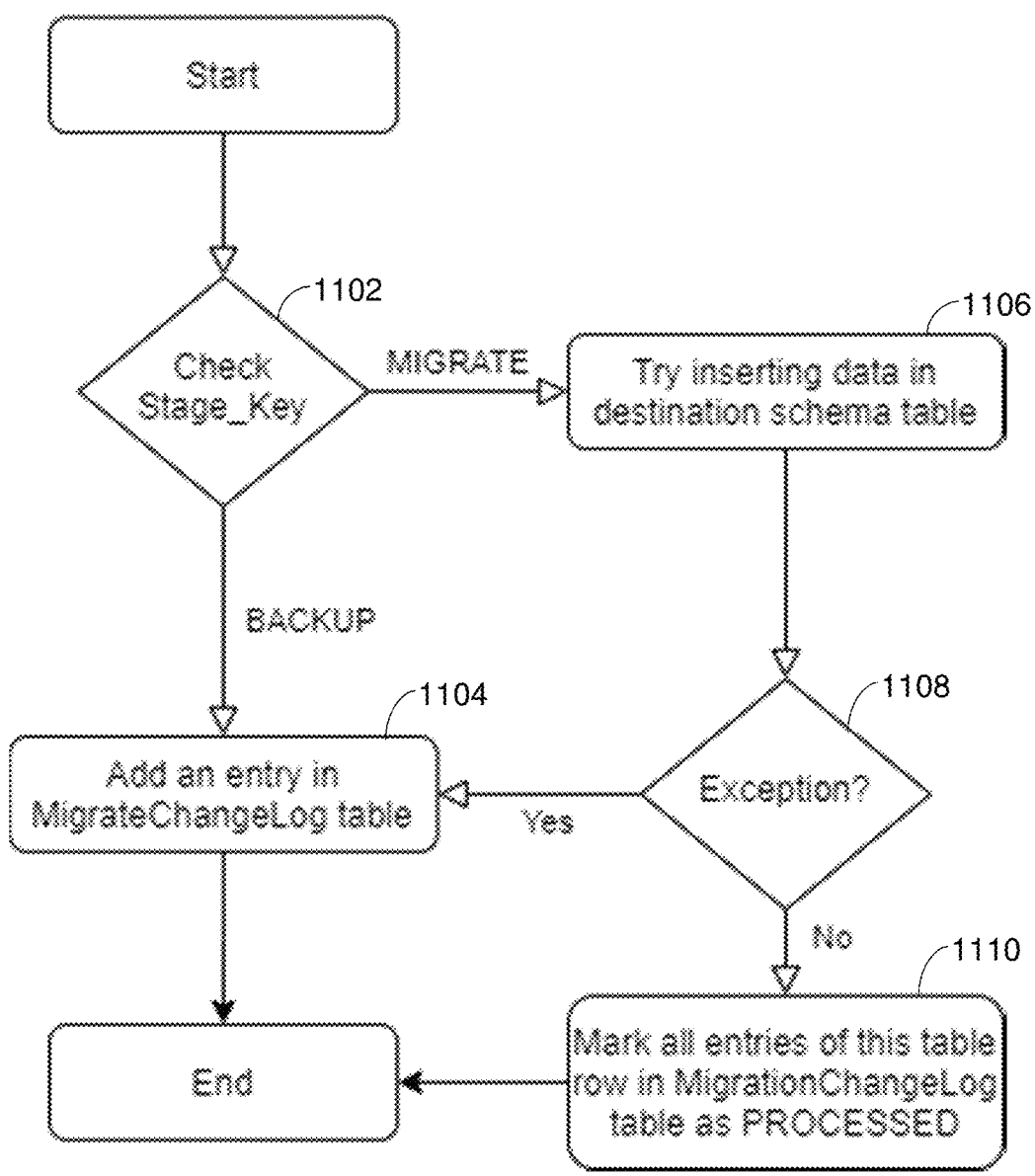
FIG. 11 is an example flowchart showing the created AFTER_INSERT trigger for the FIG. 3 example in accordance with certain example embodiments.

Second, FIG. 11 is an example flowchart showing the created AFTER_INSERT trigger in accordance with certain example embodiments. This example process is invoked when a record is created, for example. In step 1102, the stage key is checked. If the stage is the backup stage, then an entry is added in the migrate change log table in step 1104, reflecting the need to create a backup with respect to a newly created record or the like, and the process is ended. On the other hand, if the stage is the migrate stage, then an attempt to insert data in the destination table structured using the new schema is made in step 1106. If no exceptions are thrown as determined in step 1108, then all entries of the table row in the migration change log table are marked as processed in step 1110 and the process is ended. If exceptions are thrown, then an entry is created in the migrate change log table in step 1104. Here, for example, the triggers will catch foreign key constraint violation exceptions and will make an entry in the change log table to be processed by the migration procedure at later point. In other words, foreign key constraint violation exceptions can happen here, as well. This type of exception could occur, for example, if the migration procedure is still processing the change logs and this trigger tries to update the table row for which the foreign key column entry is not yet inserted in the new schema table. Here, unlike migration procedure, triggers will catch the exception and only add a new change log entry before finishing. Certain example embodiments also may use AFTER_INSERT triggers to catch primary key constraint violation exceptions. This may arise, for instance, if the same table row is deleted in the backup stage that has an entry in the change log table and is not yet processed. Now, in the migrate stage when the same table row is again inserted, the trigger will catch the exception and can handle it by, for example, (1) adding a new change log entry and finish, or (2) trying an UPDATE operation and, if successful, marking all change log entries of this table row as processed and otherwise adding a new change log entry and finishing. The latter in essence involves a branch from step 1104 to step 1308, described below.

Figure 12:
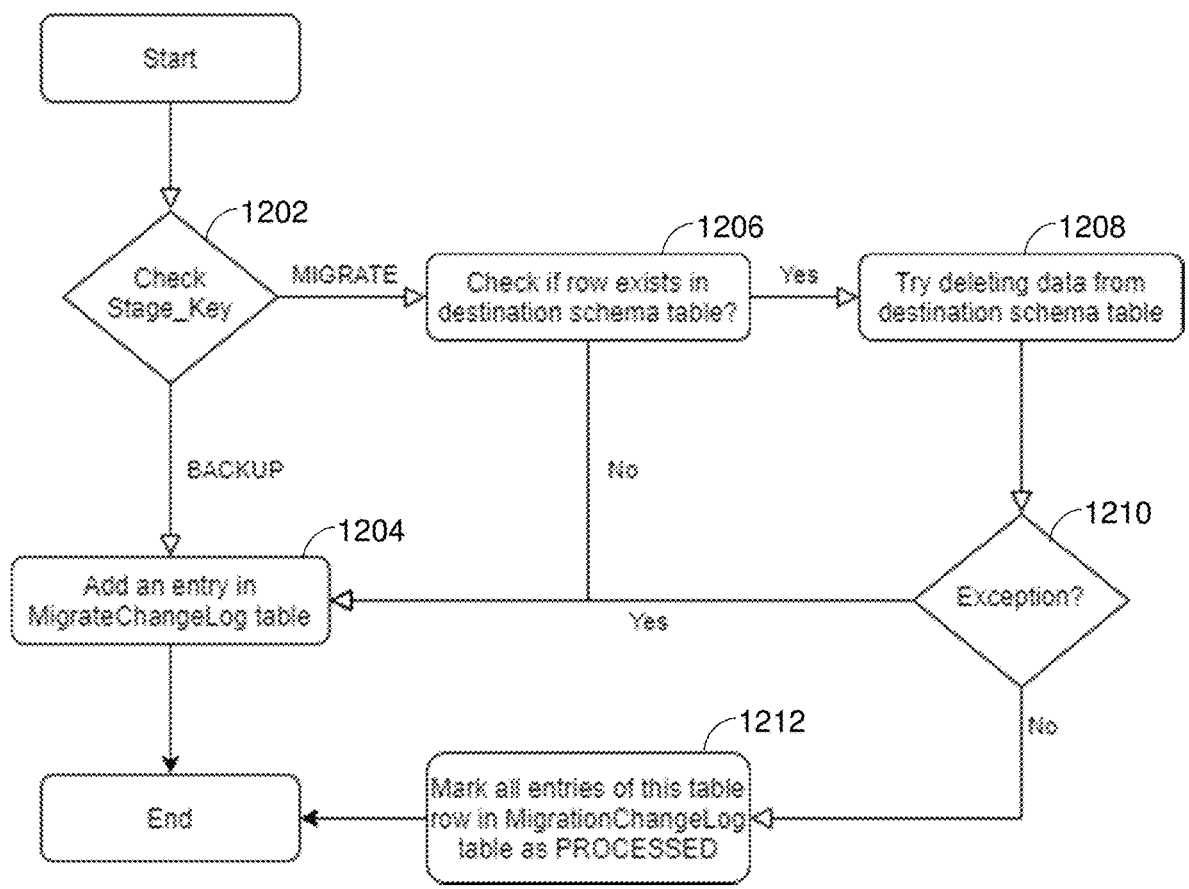
FIG. 12 is an example flowchart showing the created AFTER_DELETE trigger for the FIG. 3 example in accordance with certain example embodiments.

Third, FIG. 12 is an example flowchart showing the created AFTER_DELETE trigger in accordance with certain example embodiments. This example process is invoked when a record is deleted, for example. In step 1202, stage key is checked. If the stage is the backup stage, then an entry is added in the migrate change log table in step 1204, reflecting the need to delete an existing record or the like, and the process is ended. On the other hand, if the stage is the migrate stage, then a determination is made in step 1206 as to whether there is an existing row in the destination table structured using the new schema. If not, then an entry is added in the migrate change log table in step 1204 and the process is ended. This case indicates that the INSERT operation is not yet processed in destination schema table and so an appropriate row is not found. This case can be handled in multiple ways. For example, an entry can be added in the change log table so that the migration procedure will take care of it, e.g., as implied. Alternatively, because the destination schema table lacks the entry, the INSERT operation for this table row has not yet been processed by the migration procedure, so one can simply mark all the change log entries for this table row as processed and finish. If, however, there is a row in the destination table structured using the new schema as determined in step 1206, then an attempt is made to delete the data from the destination schema table in step 1208. If there is an exception thrown in step 1210, then an entry is added to the migrate change log in step 1204 and the process is ended. For example, a foreign key constraint failure may be caught, e.g., if there are any child table update change log entries that have not yet been processed by the migration procedure. The triggers can catch this issue and make an entry in the change log table to be processed by migration procedure at a later point. If no exceptions are thrown in step 1210, then all entries for the table row in the migration change log table are marked as processed in step 1212, and the FIG. 12 process is ended.

Figure 13:
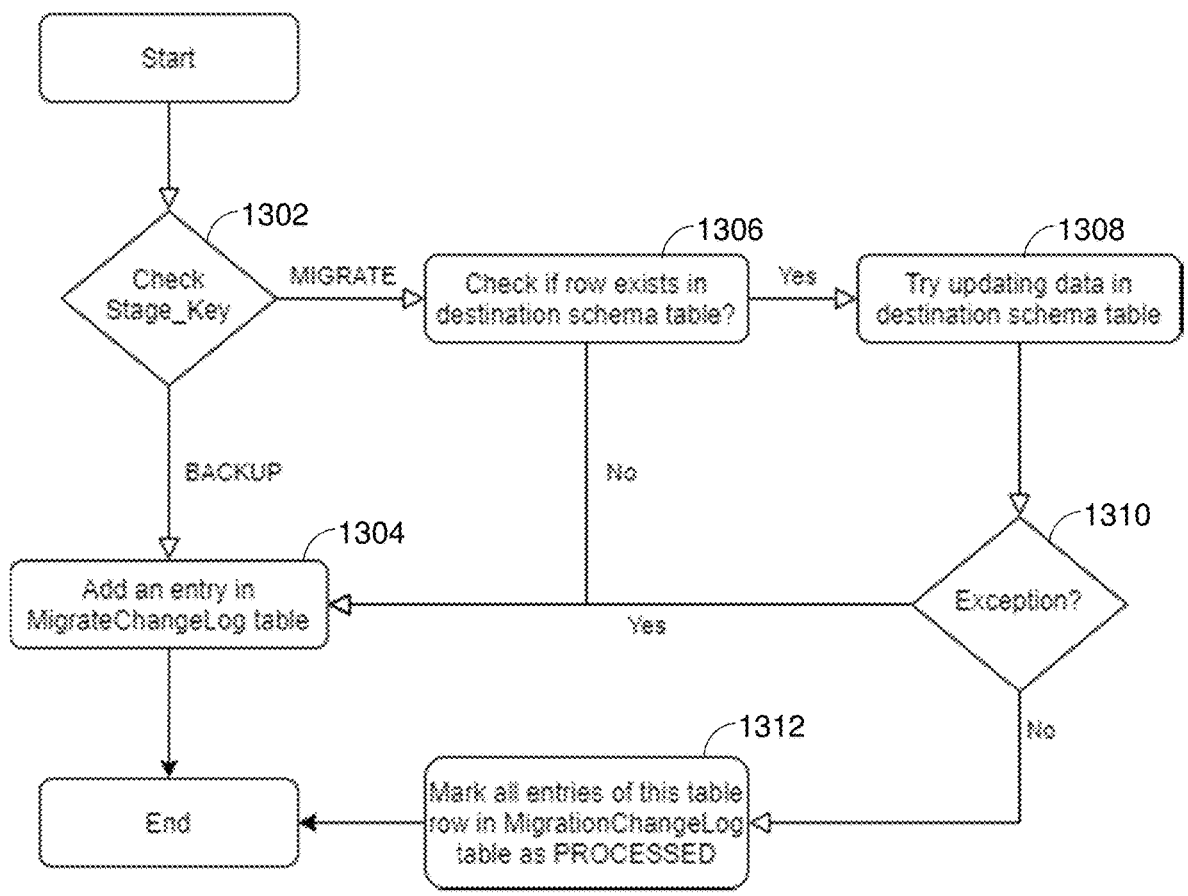
FIG. 13 is an example flowchart showing the created AFTER_UPDATE trigger for the FIG. 3 example in accordance with certain example embodiments.

Fourth, FIG. 13 is an example flowchart showing the created AFTER_UPDATE trigger in accordance with certain example embodiments. This example process is invoked when a record is updated, for example. In step 1302, stage key is checked. If the stage is the backup stage, then an entry is added in the migrate change log table in step 1304, reflecting the need to update an existing record or the like, and the process is ended. On the other hand, if the stage is the migrate stage, then a determination is made in step 1306 as to whether there is an existing row in the destination table structured using the new schema. If not, then an entry is added in the migrate change log table in step 1304 and the process is ended. This case indicates that the INSERT operation is not yet processed in destination schema table and so an appropriate row is not found. Thus, the update cannot be processed. For example, an entry can be added in the change log table so that the migration procedure will take care of it, e.g., as implied. If, however, there is a row in the destination table structured using the new schema as determined in step 1306, then an attempt is made to update the data in the destination schema table in step 1308. If there is an exception thrown in step 1310, then an entry is added to the migrate change log in step 1304 and the process is ended. If no exceptions are thrown in step 1310, then all entries for the table row in the migration change log table are marked as processed in step 1312, and the FIG. 13 process is ended. Foreign key constraint exceptions can be caught here, as well. As the latest data from the original schema table is copied to the new schema table, there may be some scenarios where foreign key columns have not yet been inserted into the new schema tables and are yet to be processed from the change log. In this case, the trigger can add an entry in the change log table for the migration procedure to process it later.

After the FIG. 10 migrate change logs procedure and the FIG. 11-13 triggers are set up, the migration stage in the migration stage table is set to BACKUP. Once the migration stage is set to BACKUP, the triggers will start recording the data-related table changes in the migration change log table. FIG. 14 is a set of example statements that are runnable on "schema-v1" in accordance with the HR example. These statements reflect data-related updates to various tables structured in accordance with the source schema. Assume that the FIG. 14 statements are run on "schema-v1" after the migration stage is set to BACKUP in the migration stage table. FIG. 15 shows the migration change log table after the FIG. 14 statements are run while the migration stage is set to BACKUP in the migration stage table.

A database dump from the source schema is created, and it will be restored to create data structured in accordance with the new schema, "schema-v2." The product specific database migration scripts are run to create this structure. The migration is started by running the created migration procedure and synchronizing the data structured using the new schema "schema-v2" with the data structured using the source schema "schema-v1." In the migration stage table, the migration stage is set to MIGRATE and the migration status is set to RUNNING. Data from the "schema-v1" tables is copied to the "schema-v2" tables using SQL statements from the migration reference tables, as discussed above. Once the source schema and new schema are synchronized in the sense that there are no more unprocessed entries in the migration change log table, the migration status is changed to COMPLETED.

The approach taken by certain example embodiments is advantageous for a number of reasons, especially in comparison with current techniques. Unlike some conventional techniques that require schema backward compatibility, the techniques of certain example embodiments are able to use a new schema wherein any ALTER statement can be run. The data is migrated using the SQL statements prepared using the PrepareMigrationReferences procedure, and any schema incompatibility changes can be handled by receiving user inputs and updating the migration reference table 110 accordingly.

Unlike some conventional techniques that lack support for foreign keys in a change table, the techniques of certain example embodiments can work on all tables in a schema rather than only specific tables. The techniques described herein can be used to capture and propagate changes according to the order of changes in different tables. Thus, any foreign key(s) present can be handled properly. In a similar vein, unlike some conventional techniques that lack support for the updating of primary key(s) in the change table, the approach of certain example embodiments creates AFTER_triggers on tables such that if any of the primary key values change, two entries can be added in the migration change log table 112, one being a DELETE with the WHERE_CONDITION using the OLD values, and another one being an INSERT with the WHERE_CONDITION using the NEW values.

Because certain example embodiments do not use a ghost table, problems associated with techniques that lack atomic renaming where "table not found" errors can happen for a short period do not occur. Similarly, because ghost tables are not used in certain example embodiments, there is no issue with table renames causing locking, and blocking occurring while a big table is dropped.

Certain example embodiments replicate data from the source schema to the destination schema both synchronously (using AFTER_triggers) and asynchronously (using the MigrateChangeLogs procedure). Once the asynchronous procedure run ends, the replication is always synchronous. Thus, issues with replication lag during asynchronous replication can be reduced. In a somewhat similar vein, performance issues associated with database binary log stream I/O operations and network delays during migration are reduced in certain example embodiments. That is, certain example embodiments do not make use of database binlog event stream, so I/O operations are not needed, and the migration can occur using triggers and procedures, thereby helping to avoid network delays.

In some conventional approaches, multiple updates on the same row may be migrated using multiple statements. Certain example embodiments copy/replicate the latest data of a row in a table, so even if there are multiple change log entries in the migration change log table 112 for the same row (the same WHERE_CONDITION) of a schema table, the data is copied only once, and all other change log entries can be marked as processed. A logical implementation may be performed for the AFTER_triggers and the migration procedure (relating to the MigrateChangeLogs procedure in particular) using the INFORMATION_SCHEMA' system table to facilitate this functionality.

Using certain example embodiments, one can automate the migration by writing an external tool to facilitate preparatory steps. Furthermore, once the triggers are activated, the remaining migration operations can happen automatically and without user intervention in the database server itself.

Advantageously, rollbacks can be easily accomplished with certain example embodiments. For example, to accomplish a rollback, the migration can be paused by changing the migration stage_key in the migration stage table to "NOT STARTED" (or anything apart from BACKUP or MIGRATE). Once the migration is paused, the migration procedures and triggers can be dropped. The application will continue using the source database, and the target schema generated can be safely removed.

Certain example embodiments advantageously can be used in connection with any suitable application deployment technique (e.g., blue/green, canary, rolling, etc.), as certain example embodiments take an approach to database layer migration that does not depend on any particular application layer migration.

In certain example embodiments, the migration change table may be pre-processed in order to optimize the migration. One or more of the following and/or other optimizations may be applied. First, when an INSERT/UPDATE operation log entry is processed successfully, either by trigger or migration procedure, mark all the change log entries (except for DELETE operations) for that table row as processed. This way, even if a table row is updated 10 times, the update will be processed only once and all entries will be marked as processed. This is possible because the updated data for each change log is not maintained. Instead, while processing the change log, the latest data is copied from the original schema table to the destination schema table. Second, in the BACKUP stage, when a DELETE operation change log entry is encountered and the migration change log table already has an entry with an INSERT operation for the same table row, mark all the change logs for that table row as processed. Third, in the MIGRATE stage, when a DELETE operation change log is encountered, delete the row from the destination table and mark all change log entries for that table row as processed. On an exception, add an entry in change log table.

Based on the above, it will be appreciated that the triggers are not only cross-schema triggers, but also multi-purpose (e.g., dual-purpose) triggers. With regard to the latter, a single trigger operates differently at different stages of the migration. For example, the triggers are created during the setup stage for subsequent activation. During the backup stage, they are activated to enable the recording, in the migration change log table, of information about data-related actions performed on tables in the database structured according to the source database schema. During the migration stage, the triggers are activated to replay further data-related actions performed on tables in the database structured according to the source database schema encountered during a migration stage to be reflected in new tables structured according to the target database schema and handle anticipated exceptions encountered during the replay.

It will be appreciated from the description above and from the FIG. 10-13 flowcharts that exceptions are in essence planned for as the approach of certain example embodiments walk through the logs. That is, exceptions are anticipated or considered in a sense part of the normal case. Their resolutions can be performed in any number of automatic and programmatic ways, as indicated above, and these resolutions can be pre-programmed in code executed during the migration.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Appendix A

To help provide further explanation for how the techniques of certain example embodiments operate, the following appendices provide example code for the HR example discussed in detail above.

Appendix B includes code that creates a sample database schema "schema-v1" and a few sample tables, as explained above.

Appendix C includes code that inserts sample data into sample tables created in the Appendix B example code.

Appendix D includes code that creates migration tables as per the changes discussed above.

Appendix E includes code that inserts data into the schema changes table in line with the example above.

Appendix F includes code that creates migration procedures. It calls the procedure "PrepareMigrateScriptsForAllTables" to populate the migration reference table.

Appendix G includes code that creates AFTER_triggers for all sample tables, and changes the migration stage_key to BACKUP.

Appendix H shows the triggers generated from Appendix G.

As an intermediate operation, the SQL dump i taken and restored so as to create the new database schema "schema-v2". The following commands can be used to create and restore the SQL dump in a local space:

```
CREATE DUMP - echo CREATE DATABASE IF NOT EXISTS
  'schema-v2'; USE 'schema-v2'; > C:\\dumpPath\\sqldump.sql &&
  "C:\\Program Files\\MySQL\\MySQL Server 5.7\\bin\\mysqldump"
  -u root - pmanage@2 schema-v1 --routines --skip-triggers --ignore-
  table=schema-v1.migrationreference --ignore-table=schema-
  v1.migrationchangelog --ignore-table=schema-v1.migrationstage >>
  C:\dumpPath\sqldump.sql && echo DROP PROCEDURE IF EXISTS
  PrepareMigrateScripts;DROP PROCEDURE IF EXISTS
  PrepareMigrateScriptsForAllTables;DROP PROCEDURE IF EXISTS
  migratechangelogs;DROP PROCEDURE IF EXISTS migraterow; >>
  C:\\dumpPath\\sqldump.sql
RESTORE DUMP - "C:\\Program Files\\MySQL\\MySQL Server
  5.7\\bin\\mysql" -u root -pmanage@2 schema-v1 <
  C:\dumpPath\sqldump.sql
Replace the mysql client directory path, username and password as
  per local setup ##
```

Appendix I includes code that executes sample DML scripts to replicate live transactions.

Appendix J includes code that executes a sample table's schema changes scripts and calls the migrate change logs procedure to start the migration.

Appendix K provides a first example use case, demonstrating where exception handling may be employed.

Appendix L provides a second example use case, demonstrating where exception handling may be employed.

It will be appreciated that the triggers and procedures presented herein are provided for proof-of-concept purposes. Those skilled in the art may wish to implement further exception handing and handle additional "corner cases" that are not expressly provided for in these specific limited examples, e.g., in order to provide a more robust offering.

Appendix J

The product schema change script is as follows:

```
USE 'schema-v2';
ALTER TABLE employees CHANGE email email_id VARCHAR
  (100) NOT NULL;
ALTER TABLE employees MODIFY COLUMN salary INT (10) NOT
  NULL;
ALTER TABLE dependents MODIFY COLUMN relationship
  VARCHAR (10) NOT NULL;
ALTER TABLE employees ADD COLUMN gender VARCHAR(12);
-- change Primary key column name for employees table ( employee_id
  -> emp_id)
ALTER TABLE dependents DROP FOREIGN KEY 'dependents_em-
  ployee_id_fk';
ALTER TABLE employees DROP FOREIGN KEY 'em-
  ployees_manager_id_fk';
ALTER TABLE employees CHANGE employee_id emp_id INT (11)
  AUTO_INCREMENT;
ALTER TABLE dependents ADD CONSTRAINT 'dependents_em-
ployee_id_fk'
FOREIGN KEY (employee_id) REFERENCES employees (emp_id)
  ON DELETE CASCADE ON UPDATE CASCADE;
ALTER TABLE employees ADD CONSTRAINT 'em-
ployees_manager_id_fk'
FOREIGN KEY (manager_id) REFERENCES employees (emp_id) ON
  DELETE CASCADE ON UPDATE CASCADE;
```

The script for running the migration is as follows

```
-- LAST STEP: RUN MIGRATION PROCEDURE -------------
  USE 'SCHEMA-V1';
  CALL MIGRATECHANGELOGS( );
```

Appendix K

```
/**
USECASE-1: This usecase does following:
    - Adds following change logs
        CID    TABLE_NAME      OPERATION    WHERE_CONDITION
        1      locations       INSERT       'location_id' = '2000'
        2      employees       INSERT       'employee_id' = '300'
        3      departments     INSERT       'department_id' = '12'
        4      employees       UPDATE       'employee_id' = '2000'
        5      departments     DELETE       'department_id' = '10'
> Migration procedure process these change logs as follows:
    - locations INSERT change log will be processed successfully
with PROCESSED_FLAG = 1
    - employees INSERT change log will with FK constraint
voilation error and will update the LAST_FAILED_OPERATION column
of the next change log for same table row. This change log will
be marked as PROCESSED_FLAG = 3
    - departments INSERT change log will be processed successfully
with PROCESSED_FLAG = 1
    - employees UPDATE change log will be processed as INSERT
(taken from LAST_FAILED_OPERATION) successfully with
PROCESSED_FLAG = 1
    - departments DELETE change log will be processed successfully
with PROCESSED_FLAG = 1
*/
USE 'schema-v1';
```

```
-- set the migration stage to BACKUP
Update migrationstage SET stage_key = 'BACKUP';
    /** Perform some DML operaions which will get logged in change log
        table */
    INSERT INTO
        locations(location_id,street_address,postal_code,city,state_prov-
        ince,country) VALUES (2000,'2004 Charade
        Rd','98199','Seattle','Washington','US');
    INSERT INTO
        employees(employee_id,first_name,last_name,email,phone_num-
        ber,hire_date,job_id,salary,manager_id,department_id) VALUES
        (300,'Shelley','Higgins','shelley.higgins@sqltutori-
        al.org','515.123.8080','1994-06-07',2,12000.00,101,10);
    INSERT INTO departments(department_id,department_name,location_id)
        VALUES (12,'Development',2000);
    UPDATE employees SET department_id=12 where employee_id=300;
    DELETE FROM departments WHERE department_id=10;
    -- call migration procedure
    call migratechangelogs( );
```

Appendix L

```
/**
USECASE-2: This usecase does following:
    - Adds following change logs
        CID   TABLE_NAME   OPERATION    WHERE_CONDITION
        1     locations    DELETE       'location_id' = '2000' -
    - This entry will come if USECASE-1 is already run
        2     locations    INSERT       'location_id' = '2000'
        3     locations    UPDATE       'location_id' = '2000'
        4     locations    UPDATE       'location_id' = '2000'
    > Migration procedure process these change logs as follows:
        - locations DELETE change log will be skipped when INSERT
    change log comes with PROCESSED_FLAG = 2
        - locations INSERT will fail with duplicate entry error and
    then will try with UPDATE operation and will get successfully
    relicated with PROCESSED_FLAG = 1
        - All other locations UPDATE change logs for the table row
    ('location_id' = '2000') will get skipped due to above
    step(INSERT) success with PROCESSED_FLAG = 2
*/
USE 'schema-v1';
-- set the migration stage to BACKUP
Update migrationstage SET stage_key = 'BACKUP';
/** Perform some DML operaions which will get logged in change log
    table */
DELETE FROM locations WHERE location_id=2000;
INSERT INTO
    locations(location_id,street_address,postal_code,city,state prov-
    ince,country) VALUES (2000,'2004 Charade
    Rd','98199','Seattle','Washington','US');
UPDATE locations SET country='USA' where location_id=2000;
UPDATE locations SET city='NewYork' where location_id=2000;
-- call migration procedure
call migratechangelogs( );
```

What is claimed is:

1. A method for migrating data in a database provided by a database server to a target database schema from tables structured according to a source database schema, the database server being configured to receive and respond to requests from external client devices using the database, the method comprising:
   in a setup stage, while allowing data modifications to be performed on the tables in the database structured according to the source database schema:
      creating, on the database server, a migration reference table and a migration change log table in response to an indication that data in the database is to be migrated;
      automatically populating the migration reference table with instructions performable to implement changes to accommodate the migration;
      automatically generating a custom migration procedure, performable within the database server, to process the instructions in the migration reference table to perform the migration; and
      automatically creating triggers of at least at least three different trigger types, the triggers structured to (a) during a backup stage, record, in the migration change log table, information about data-related actions performed on tables in the database structured according to the source database schema, and (b) during a migration stage, processing further data-related actions performed on tables in the database structured according to the source database schema by attempting to modify new tables structured according to the target database schema, wherein anticipated exceptions encountered during the processing are handled by writing entries to the migration change log table, wherein the triggers are automatically performable within the database server once activated;
   in the backup stage:
      activating the created triggers to enable the recording of (a); and
      running the generated custom migration procedure to conform a restored version of the data in the tables structured according to the source database schema to the target database schema, while the created triggers are activated and while also allowing data modifications to be performed on the tables in the database structured according to the source database schema;
   in the migration stage:
      replicating, using the generated custom migration procedures, in the tables structured according to the target database schema, data modifications made to the tables in the database structured according to the source database schema during the backup stage by processing the information about the data-related actions recorded in the migration change log table, while continuing to have the created triggers active to perform the replaying of (b); and
   following the migration stage, receiving and responding to new incoming requests in connection with the tables structured according to the target database schema.

2. The method of claim 1, wherein the instructions performable to implement changes to the source database schema to accommodate the migration are SQL statements.

3. The method of claim 2, wherein the SQL statements are insert, delete, and update type SQL statements.

4. The method of claim 3, wherein the SQL statements are stored in a common row of the migration reference table.

5. The method of claim 1, wherein:
the creating further creates a schema changes table;
a user populates the schema changes table with migration definitions that facilitate the source database schema being modified into the target database schema; and
the creation of the triggers and the generation of the custom migration procedure is based on the migration definitions in the schema changes table.

6. The method of claim 1, wherein the triggers are structured as AFTER_statements for the recording of (a).

7. The method of claim 1, wherein the at least three different trigger types include INSERT, DELETE, and UPDATE database actions.

8. The method of claim 1, further comprising prior to the running of generated custom migration procedure and while the created triggers are activated, backing up the database during the backup stage, wherein data modifications are performable on the tables in the database structured according to the source database schema during the backing up.

9. The method of claim 8, further comprising restoring the backed up database prior to the running of generated custom migration procedure.

10. The method of claim 1, wherein, during the migration stage, when no exception is encountered when the new table(s) are modified, mark all other records within the migration change log table as processed based on the rows(s) within the new tables(s) that have been modified.

11. The method of claim 1, wherein the migration change log table associates data changes with unique identifiers of the data being changed and wherein associations in the migration change log table store WHERE conditions without also storing new data itself.

12. The method of claim 11, wherein processing of the change log table entries causes the new data to be retrieved, in real time, from the tables according to the source database schema for inclusion in the tables according to the target database schema.

13. The method of claim 1, wherein the anticipated exceptions relate to data and/or data structure synchronization.

14. The method of claim 1, wherein the anticipated exceptions include primary key constraint violations.

15. The method of claim 1, wherein the anticipated exceptions include foreign key constraint violations for insert, update, and delete operations.

16. A non-transitory computer readable storage medium storing instructions that, when executed by at least one processor of a database server configured to receive and respond to requests from external client devices using a database hosted thereon, cause the database server to migrate data in the database to a target database schema from tables structured according to a source database schema by performing operations comprising:
in a setup stage, while allowing data modifications to be performed on the tables in the database structured according to the source database schema:
creating, on the database server, a migration reference table and a migration change log table in response to an indication that data in the database is to be migrated;
automatically populating the migration reference table with instructions performable to implement changes to accommodate the migration;
automatically generating a custom migration procedure, performable within the database server, to process the instructions in the migration reference table to perform the migration; and
automatically creating triggers of at least at least three different trigger types, the triggers structured to (a) during a backup stage, record in the migration change log table, information about data-related actions performed on tables in the database structured according to the source database schema, and (b) during a migration stage, processing further data-related actions performed on tables in the database structured according to the source database schema by attempting to modify new tables structured according to the target database schema, wherein anticipated exceptions encountered during the processing are handled by writing entries to the migration change log table, wherein the triggers are automatically performable within the database server once activated;
in the backup stage:
activating the created triggers to enable the recording of (a); and
running the generated custom migration procedure to conform a restored version of the data in the tables structured according to the source database schema to the target database schema, while the created triggers are activated and while also allowing data modifications to be performed on the tables in the database structured according to the source database schema;
in the migration stage:
replicating, using the generated custom migration procedures, in the tables structured according to the target database schema, data modifications made to the tables in the database structured according to the source database schema during the backup stage by processing the information about the data-related actions recorded in the migration change log table, while continuing to have the created triggers active to perform the replaying of (b); and
following the migration stage, receiving and responding to new incoming requests in connection with the tables structured according to the target database schema.

17. The non-transitory computer readable storage medium of claim 16, wherein the instructions performable to implement changes to the source database schema to accommodate the migration are SQL statements, the SQL statements being stored in a common row of the migration reference table.

18. The non-transitory computer readable storage medium of claim 16, wherein the migration change log table associates data changes with unique identifiers of the data being changed, wherein associations in the migration change log table store WHERE conditions without also storing new data itself.

19. The non-transitory computer readable storage medium of claim 18, wherein processing of the change log table entries causes the new data to be retrieved, in real time, from the tables according to the source database schema for inclusion in the tables according to the target database schema.

20. The non-transitory computer readable storage medium of claim 16, wherein the anticipated exceptions relate to data and/or data structure synchronization, and exception handling is pre-programmed.

21. A database server, comprising:
a database backed by a non-transitory computer readable storage medium;
at least one processor configured to receive and respond to requests from external client devices using a database hosted thereon,
the at least one processor being further configured to cause the database server to migrate data in the database to a target database schema from tables structured according to a source database schema by performing operations comprising:
in a setup stage, while allowing data modifications to be performed on the tables in the database structured according to the source database schema:
creating, on the database server, a migration reference table and a migration change log table in response to an indication that data in the database is to be migrated;
automatically populating the migration reference table with instructions performable to implement changes to accommodate the migration;
automatically generating a custom migration procedure, performable within the database server, to process the instructions in the migration reference table to perform the migration; and
automatically creating triggers of at least at least three different trigger types, the triggers structured to (a) during a backup stage, record in the migration change log table, information about data-related actions performed on tables in the database structured according to the source database schema, and (b) during a migration stage, processing further data-related actions performed on tables in the database structured according to the source database schema by attempting to modify new tables structured according to the target database schema, wherein anticipated exceptions encountered during the processing are handled by writing entries to the migration change log table, wherein the triggers are automatically performable within the database server once activated;
in the backup stage:
activating the created triggers to enable the recording of (a); and
running the generated custom migration procedure to conform a restored version of the data in the tables structured according to the source database schema to the target database schema, while the created triggers are activated and while also allowing data modifications to be performed on the tables in the database structured according to the source database schema;
in the migration stage:
replicating, using the generated custom migration procedures, in the tables structured according to the target database schema, data modifications made to the tables in the database structured according to the source database schema during the backup stage by processing the information about the data-related actions recorded in the migration change log table, while continuing to have the created triggers active to perform the replaying of (b); and
following the migration stage, receiving and responding to new incoming requests in connection with the tables structured according to the target database schema.

22. The database server of claim 21, wherein the instructions performable to implement changes to the source database schema to accommodate the migration are SQL statements, the SQL statements being stored in a common row of the migration reference table.

23. The database server of claim 21, wherein the migration change log table associates data changes with unique identifiers of the data being changed, wherein associations in the migration change log table store WHERE conditions without also storing new data itself.

24. The database server of claim 23, wherein processing of the change log table entries causes the new data to be retrieved, in real time, from the tables according to the source database schema for inclusion in the tables according to the target database schema.

25. A computing system comprising:
the database server of claim 21; and
an application server supporting an application configured to interface with the database provided by the database server.

* * * * *